March 24, 1936.  W. A. GIBSON  2,035,367
MEANS FOR ABSORBING THE ENERGY OF A FALLING BODY
Filed June 3, 1932
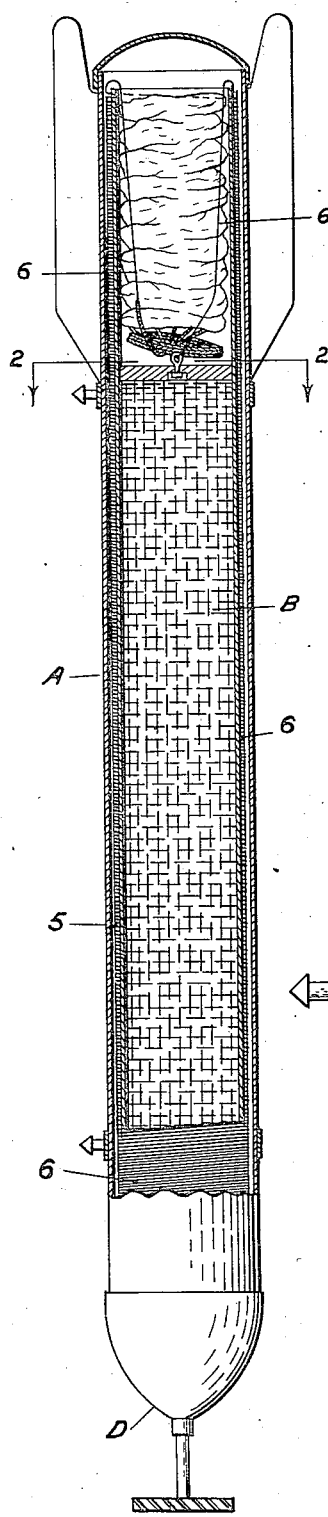
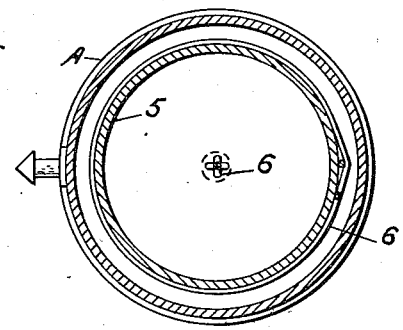
Inventor
William A. Gibson
W. N. Roach
Attorney Patented Mar. 24, 1936

2,035,367

UNITED STATES PATENT OFFICE 2,035,367

MEANS FOR ABSORBING THE ENERGY OF A FALLING BODY

William A. Gibson, Succasunna, N. J., assignor to Secretary of War of the United States of America, trustee Application June 3, 1932, Serial No. 615,180

2 Claims. (Cl. 102—24)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for absorbing the energy of a falling body.

When a parachute and a body to be supported thereby fall through a great distance before the parachute is opened, the shock occasioned by the sudden retardation is frequently sufficient to cause the shrouds or the fabric of the parachute to give way.

As a means of gradually retarding the falling body it is proposed in the present invention to absorb its energy through the permanent deformation of a long ductile wire associated with the body in a novel manner.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view partly in longitudinal section and partly in side elevation of a flare embodying the principles of the invention.

Fig. 2 is a detail sectional view on the line 2—2 of Fig. 1.

There is shown a flare adapted to be launched from aircraft and consisting generally of a container A, an illuminant B, a parachute C for supporting the illuminant, and a fuse D for expelling the illuminant and parachute from the container at a predetermined time during flight.

The casing 5 which contains the illuminant is extended to also house the folded parachute. A thin wire 6 of ductile material forms the connection between the illuminant and parachute and is coiled about the casing 5 commencing at the bottom. In the present example with a casing 5 having a diameter of four inches and a length of 36 inches it is possible to coil 377 feet of 14 gauge wire around the casing.

The length and properties of the wire that is selected for a particular task will depend upon the weight of the flare and the maximum distance that it is to travel before being expelled from its container. The available energy in a unit of length of wire neglecting spring and torsion action which is so small as to be negligible is calculated from well known formulæ, or, more conveniently, taken from a table of strength for said wire, and a length of wire is selected having a total available energy that approximately equals the kinetic energy of a thirteen pound flare released after a flight of four thousand feet. In this example the flare, travelling at a rate of four hundred feet per second has a kinetic energy of 32,500 foot pounds. However only about forty per cent of the kinetic energy of the illuminant need be absorbed in the permanent deformation of the wire as the remainder is dissipated in air currents around the parachute which is opened immediately upon its release. By virtue of the retardation thus produced a total pull of less than one hundred and twenty-five pounds will be transmitted to the parachute. This is well within the safety factor as the parachute can resist a pull of two hundred pounds.

In operation, when the illuminant and parachute are expelled from the container the parachute immediately opens while the illuminant continues its flight uninterruptedly for 377 more feet before the wire 6 is drawn taut. The energy of the illuminant is then partly absorbed in the permanent deformation of the ductile wire and partly by the open parachute.

I claim:

1. A flare comprising a container, a casing inside the container, an illuminant carried by the casing, a parachute housed in the casing above the illuminant, a ductile wire connecting the illuminant and parachute, said wire coiled about the casing commencing at the bottom thereof, and means for expelling the casing from the container.

2. A flare comprising a container, a casing inside the container, an illuminant carried by the casing, a parachute housed in the casing above the illuminant, a wire connecting the illuminant and parachute and disposed between the casing and the container, and means for expelling the casing from the container.

W. A. GIBSON.